UNITED STATES PATENT OFFICE.

SAMUEL PEACOCK, OF NEW YORK, N. Y.

PROCESS OF MAKING CARBONYL CHLORID.

1,360,312.   Specification of Letters Patent.   Patented Nov. 30, 1920.

No Drawing.   Application filed October 29, 1919.   Serial No. 334,333.

*To all whom it may concern:*

Be it known that I, SAMUEL PEACOCK, a citizen of the United States, residing at New York city, in the county of New York and State of New York, have invented certain new and useful Improvements in Processes of Making Carbonyl Chlorid; and I do hereby declare the following to be a full, clear, and exact description of the invention, such as will enable others skilled in the art to which it appertains to make and use the same.

This invention relates to a process of making carbonyl chlorid and has for its object to produce this product in a manner less costly and more expeditious than has heretofore been proposed.

With this and other objects in view the invention consists in the novel steps and combinations of steps constituting the process all as will be more fully hereinafter disclosed and particularly pointed out in the claim.

In carrying out my invention I heat coke to a temperature of from say 1200° C. to 1500° C. as by employing the same as a resistor in an electric furnace of a suitable type, and pass through the heated mass of coke a mixture of air and chlorin, the latter being in substantially the proper chemical proportions, whereupon a reaction will occur in accordance with the following equation:

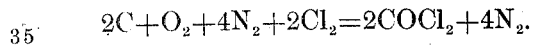

The carbonyl chlorid $COCl_2$ thus produced is recovered as by condensation, the nitrogen being allowed to escape, or it may be collected if desired.

The carbon consumed by the reaction is replaced from time to time through the facilities afforded by the particular type of furnace employed, and the reaction is thus made practically continuous. The presence of nitrogen with the carbonyl chlorid does not interfere with the use of the latter for many important purposes, and therefore in some cases I may use the mixture produced by the above reaction, without any separation of its constituents, to bring about other reactions such, for example, as the cracking of higher hydrocarbons to produce lower hydrocarbons, and in the manufacture of benzoyl chlorids of which the following equation will give an example:

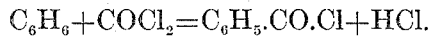

This nitrogen containing carbonyl chlorid mixture can also be used in bringing about inorganic reactions, as is illustrated by the following equation:

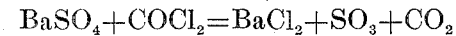

Said carbonyl mixture is also useful in the manufacture of anhydrous metal chlorids, when using as a source of the metal the less expensive forms of the minerals, as is illustrated by the following equation:

What I claim is:

The method of making carbonyl chlorid which consists in passing a mixture of air and free chlorin over carbonaceous material at a temperature sufficient to produce the desired product, and collecting the formed carbonyl chlorid, substantially as described.

In testimony whereof I affix my signature, in presence of two witnesses.

SAMUEL PEACOCK.

Witnesses:
E. C. STORKEY,
E. A. WEISS.